(12) United States Patent
Jeddeloh et al.

(10) Patent No.: US 8,880,833 B2
(45) Date of Patent: *Nov. 4, 2014

(54) SYSTEM AND METHOD FOR READ SYNCHRONIZATION OF MEMORY MODULES

(71) Applicant: Micron Technology, Inc., Boise, ID (US)

(72) Inventors: Joseph M. Jeddeloh, Shoreview, MN (US); Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,526

(22) Filed: Mar. 4, 2013

(65) Prior Publication Data

US 2013/0179658 A1    Jul. 11, 2013

Related U.S. Application Data

(63) Continuation of application No. 12/233,492, filed on Sep. 18, 2008, now Pat. No. 8,392,686, which is a continuation of application No. 11/432,060, filed on May 10, 2006, now Pat. No. 7,434,081, which is a continuation of application No. 10/747,917, filed on Dec. 29, 2003, now Pat. No. 7,330,992.

(51) Int. Cl.
*G06F 12/00* (2006.01)
*G06F 13/16* (2006.01)
*G06F 1/12* (2006.01)

(52) U.S. Cl.
CPC .............. *G06F 1/12* (2013.01); *G06F 13/1689* (2013.01)
USPC ........... 711/167; 711/154; 711/170; 713/400; 713/500; 713/502; 713/501

(58) Field of Classification Search
USPC ......................................... 711/100, 154, 167
See application file for complete search history.

(56) References Cited

U.S. PATENT DOCUMENTS

| 4,045,781 A | 8/1977 | Levy et al. |
| 4,240,143 A | 12/1980 | Besemer et al. |

(Continued)

FOREIGN PATENT DOCUMENTS

| EP | 0395559 | 10/1990 |
| EP | 0843261 | 5/1998 |

(Continued)

OTHER PUBLICATIONS

"Free On-Line Dictionary of Computing", http://foldoc.doc.ic.ac.uk/foldoc.cgi?flash+memory, Flash Erasable Programmable Read-Only Memory, May 17, 2004.

(Continued)

*Primary Examiner* — Midys Rojas
(74) *Attorney, Agent, or Firm* — Dorsey & Whitney LLP

(57) ABSTRACT

A memory module includes several memory devices coupled to a memory hub. The memory hub includes several link interfaces coupled to respective processors, several memory controller coupled to respective memory devices, a cross-bar switch coupling any of the link interfaces to any of the memory controllers, a write buffer and read cache for each memory device and a read synchronization module. The read synchronization module includes a write pointer, a read pointer and a buffer. The write pointer is incremented in response to the receipt of read data. The read pointer increments in response to coupling of the read data from the memory hub. A comparator compares the read pointer an the write pointer, and the comparison is used to adjust the memory timing.

20 Claims, 3 Drawing Sheets

(56) References Cited

U.S. PATENT DOCUMENTS

| | | |
|---|---|---|
| 4,245,306 A | 1/1981 | Besemer et al. |
| 4,253,144 A | 2/1981 | Bellamy et al. |
| 4,253,146 A | 2/1981 | Bellamy et al. |
| 4,608,702 A | 8/1986 | Hirzel et al. |
| 4,707,823 A | 11/1987 | Holdren et al. |
| 4,724,520 A | 2/1988 | Athanas et al. |
| 4,891,808 A | 1/1990 | Williams |
| 4,930,128 A | 5/1990 | Suzuki et al. |
| 4,953,930 A | 9/1990 | Ramsey et al. |
| 5,133,059 A | 7/1992 | Ziegler et al. |
| 5,241,506 A | 8/1993 | Motegi et al. |
| 5,243,703 A | 9/1993 | Farmwald et al. |
| 5,251,303 A | 10/1993 | Fogg, Jr. et al. |
| 5,269,022 A | 12/1993 | Shinjo et al. |
| 5,305,389 A | 4/1994 | Palmer |
| 5,317,752 A | 5/1994 | Jewett et al. |
| 5,319,755 A | 6/1994 | Farmwald et al. |
| 5,327,553 A | 7/1994 | Jewett et al. |
| 5,355,391 A | 10/1994 | Horowitz et al. |
| 5,421,000 A | 5/1995 | Fortino et al. |
| 5,432,823 A | 7/1995 | Gasbarro et al. |
| 5,432,907 A | 7/1995 | Picazo, Jr. et al. |
| 5,442,770 A | 8/1995 | Barratt |
| 5,461,627 A | 10/1995 | Rypinski |
| 5,465,229 A | 11/1995 | Bechtolsheim et al. |
| 5,465,343 A | 11/1995 | Henson et al. |
| 5,479,370 A | 12/1995 | Furuyama et al. |
| 5,497,476 A | 3/1996 | Oldfield et al. |
| 5,502,621 A | 3/1996 | Schumacher et al. |
| 5,544,319 A | 8/1996 | Acton et al. |
| 5,566,325 A | 10/1996 | Bruce, II et al. |
| 5,577,220 A | 11/1996 | Combs et al. |
| 5,581,767 A | 12/1996 | Katsuki et al. |
| 5,606,717 A | 2/1997 | Farmwald et al. |
| 5,613,075 A | 3/1997 | Wade et al. |
| 5,619,670 A | 4/1997 | Shindo |
| 5,638,334 A | 6/1997 | Farmwald et al. |
| 5,638,534 A | 6/1997 | Mote, Jr. |
| 5,659,713 A | 8/1997 | Goodwin et al. |
| 5,659,798 A | 8/1997 | Blumrich et al. |
| 5,706,224 A | 1/1998 | Srinivasan et al. |
| 5,715,456 A | 2/1998 | Bennett et al. |
| 5,729,709 A | 3/1998 | Harness |
| 5,748,616 A | 5/1998 | Riley |
| 5,796,413 A | 8/1998 | Shipp et al. |
| 5,818,844 A | 10/1998 | Singh et al. |
| 5,819,304 A | 10/1998 | Nilsen et al. |
| 5,822,255 A | 10/1998 | Uchida |
| 5,832,250 A | 11/1998 | Whittaker |
| 5,838,931 A | 11/1998 | Regenold et al. |
| 5,875,352 A | 2/1999 | Gentry et al. |
| 5,875,454 A | 2/1999 | Craft et al. |
| 5,887,159 A | 3/1999 | Burrows |
| 5,889,714 A | 3/1999 | Schumann et al. |
| 5,928,343 A | 7/1999 | Farmwald et al. |
| 5,953,743 A | 9/1999 | Jeddeloh |
| 5,966,724 A | 10/1999 | Ryan |
| 5,973,935 A | 10/1999 | Schoenfeld et al. |
| 5,973,951 A | 10/1999 | Bechtolsheim et al. |
| 5,978,567 A | 11/1999 | Rebane et al. |
| 5,987,196 A | 11/1999 | Noble |
| 6,006,340 A | 12/1999 | O'Connell |
| 6,023,726 A | 2/2000 | Saksena |
| 6,029,250 A | 2/2000 | Keeth |
| 6,031,241 A | 2/2000 | Silfvast et al. |
| 6,033,951 A | 3/2000 | Chao |
| 6,061,263 A | 5/2000 | Boaz et al. |
| 6,061,296 A | 5/2000 | Ternullo, Jr. et al. |
| 6,067,262 A | 5/2000 | Irrinki et al. |
| 6,073,190 A | 6/2000 | Rooney |
| 6,076,139 A | 6/2000 | Welker et al. |
| 6,079,008 A | 6/2000 | Clery, III |
| 6,092,158 A | 7/2000 | Harriman et al. |
| 6,098,158 A | 8/2000 | Lay et al. |
| 6,105,075 A | 8/2000 | Ghaffari |
| 6,125,431 A | 9/2000 | Kobayashi |
| 6,128,703 A | 10/2000 | Bourekas et al. |
| 6,128,706 A | 10/2000 | Bryg et al. |
| 6,131,149 A | 10/2000 | Lu et al. |
| 6,134,624 A | 10/2000 | Burns et al. |
| 6,134,643 A | 10/2000 | Kedem et al. |
| 6,137,709 A | 10/2000 | Boaz et al. |
| 6,144,587 A | 11/2000 | Yoshida |
| 6,145,033 A | 11/2000 | Chee |
| 6,157,743 A | 12/2000 | Goris et al. |
| 6,157,962 A | 12/2000 | Hodges et al. |
| 6,167,465 A | 12/2000 | Parvin et al. |
| 6,167,486 A | 12/2000 | Lee et al. |
| 6,175,571 B1 | 1/2001 | Haddock et al. |
| 6,185,352 B1 | 2/2001 | Hurley |
| 6,185,676 B1 | 2/2001 | Poplingher et al. |
| 6,186,400 B1 | 2/2001 | Dvorkis et al. |
| 6,191,663 B1 | 2/2001 | Hannah |
| 6,201,724 B1 | 3/2001 | Ishizaki et al. |
| 6,208,180 B1 | 3/2001 | Fisch et al. |
| 6,212,590 B1 | 4/2001 | Melo et al. |
| 6,216,178 B1 | 4/2001 | Stracovsky et al. |
| 6,216,219 B1 | 4/2001 | Cai et al. |
| 6,219,725 B1 | 4/2001 | Diehl et al. |
| 6,223,259 B1 | 4/2001 | Zervens et al. |
| 6,223,301 B1 | 4/2001 | Santeler et al. |
| 6,233,376 B1 | 5/2001 | Updegrove |
| 6,243,769 B1 | 6/2001 | Rooney |
| 6,243,831 B1 | 6/2001 | Mustafa et al. |
| 6,246,618 B1 | 6/2001 | Yamamoto et al. |
| 6,247,107 B1 | 6/2001 | Christie |
| 6,249,802 B1 | 6/2001 | Richardson et al. |
| 6,252,821 B1 | 6/2001 | Nizar et al. |
| 6,256,692 B1 | 7/2001 | Yoda et al. |
| 6,272,609 B1 | 8/2001 | Jeddeloh |
| 6,285,349 B1 | 9/2001 | Smith |
| 6,286,083 B1 | 9/2001 | Chin et al. |
| 6,294,937 B1 | 9/2001 | Crafts et al. |
| 6,301,637 B1 | 10/2001 | Krull et al. |
| 6,321,233 B1 | 11/2001 | Larson |
| 6,327,642 B1 | 12/2001 | Lee et al. |
| 6,330,205 B2 | 12/2001 | Shimizu et al. |
| 6,330,639 B1 | 12/2001 | Fanning et al. |
| 6,347,055 B1 | 2/2002 | Motomura |
| 6,349,363 B2 | 2/2002 | Cai et al. |
| 6,356,573 B1 | 3/2002 | Jonsson et al. |
| 6,367,074 B1 | 4/2002 | Bates et al. |
| 6,370,068 B2 | 4/2002 | Rhee |
| 6,370,611 B1 | 4/2002 | Callison et al. |
| 6,373,777 B1 | 4/2002 | Suzuki |
| 6,381,190 B1 | 4/2002 | Shinkai |
| 6,389,514 B1 | 5/2002 | Rokicki |
| 6,392,653 B1 | 5/2002 | Malandain et al. |
| 6,401,213 B1 | 6/2002 | Jeddeloh |
| 6,405,280 B1 | 6/2002 | Ryan |
| 6,421,744 B1 | 7/2002 | Morrison et al. |
| 6,430,696 B1 | 8/2002 | Keeth |
| 6,433,785 B1 | 8/2002 | Garcia et al. |
| 6,434,639 B1 | 8/2002 | Haghighi |
| 6,434,696 B1 | 8/2002 | Kang |
| 6,434,736 B1 | 8/2002 | Schaecher et al. |
| 6,438,622 B1 | 8/2002 | Haghighi et al. |
| 6,438,668 B1 | 8/2002 | Esfahani et al. |
| 6,449,308 B1 | 9/2002 | Knight, Jr. et al. |
| 6,453,393 B1 | 9/2002 | Holman et al. |
| 6,460,108 B1 | 10/2002 | McCoskey et al. |
| 6,460,114 B1 | 10/2002 | Jeddeloh |
| 6,462,978 B2 | 10/2002 | Shibata et al. |
| 6,463,059 B1 | 10/2002 | Movshovich et al. |
| 6,467,013 B1 | 10/2002 | Nizar |
| 6,470,422 B2 | 10/2002 | Cai et al. |
| 6,473,828 B1 | 10/2002 | Matsui |
| 6,477,592 B1 | 11/2002 | Chen et al. |
| 6,477,614 B1 | 11/2002 | Leddige et al. |
| 6,477,621 B1 | 11/2002 | Lee et al. |
| 6,479,322 B2 | 11/2002 | Kawata et al. |
| 6,487,628 B1 | 11/2002 | Duong et al. |
| 6,490,188 B2 | 12/2002 | Nuxoll et al. |
| 6,493,803 B1 | 12/2002 | Pham et al. |

(56) References Cited

U.S. PATENT DOCUMENTS

| | | |
|---|---|---|
| 6,496,193 B1 | 12/2002 | Surti et al. |
| 6,496,909 B1 | 12/2002 | Schimmel |
| 6,501,471 B1 | 12/2002 | Venkataraman et al. |
| 6,502,161 B1 | 12/2002 | Perego et al. |
| 6,505,287 B2 | 1/2003 | Uematsu |
| 6,523,092 B1 | 2/2003 | Fanning |
| 6,523,093 B1 | 2/2003 | Bogin et al. |
| 6,526,483 B1 | 2/2003 | Cho et al. |
| 6,539,490 B1 | 3/2003 | Forbes et al. |
| 6,552,564 B1 | 4/2003 | Forbes et al. |
| 6,553,476 B1 | 4/2003 | Ayaki et al. |
| 6,564,329 B1 | 5/2003 | Cheung et al. |
| 6,587,912 B2 | 7/2003 | Leddige et al. |
| 6,590,816 B2 | 7/2003 | Perner |
| 6,594,713 B1 | 7/2003 | Fuoco et al. |
| 6,594,722 B1 | 7/2003 | Willke, II et al. |
| 6,598,154 B1 | 7/2003 | Vaid et al. |
| 6,611,884 B2 | 8/2003 | Castellano |
| 6,615,325 B2 | 9/2003 | Mailloux et al. |
| 6,622,227 B2 | 9/2003 | Zumkehr et al. |
| 6,628,294 B1 | 9/2003 | Sadowsky et al. |
| 6,629,220 B1 | 9/2003 | Dyer |
| 6,631,440 B2 | 10/2003 | Jenne et al. |
| 6,633,959 B2 | 10/2003 | Arimilli et al. |
| 6,636,110 B1 | 10/2003 | Ooishi et al. |
| 6,646,929 B1 | 11/2003 | Moss et al. |
| 6,647,470 B1 | 11/2003 | Janzen |
| 6,658,509 B1 | 12/2003 | Bonella et al. |
| 6,662,304 B2 | 12/2003 | Keeth et al. |
| 6,665,202 B2 | 12/2003 | Lindahl et al. |
| 6,667,895 B2 | 12/2003 | Jang et al. |
| 6,681,292 B2 | 1/2004 | Creta et al. |
| 6,681,302 B2 | 1/2004 | Cho et al. |
| 6,697,926 B2 | 2/2004 | Johnson et al. |
| 6,704,817 B1 | 3/2004 | Steinman et al. |
| 6,715,018 B2 | 3/2004 | Farnworth et al. |
| 6,718,440 B2 | 4/2004 | Maiyuran et al. |
| 6,721,195 B2 | 4/2004 | Brunelle et al. |
| 6,724,685 B2 | 4/2004 | Braun et al. |
| 6,728,800 B1 | 4/2004 | Lee et al. |
| 6,735,679 B1 | 5/2004 | Herbst et al. |
| 6,735,682 B2 | 5/2004 | Segelken et al. |
| 6,745,275 B2 | 6/2004 | Chang |
| 6,748,493 B1 | 6/2004 | Arroyo et al. |
| 6,751,703 B2 | 6/2004 | Chilton |
| 6,754,117 B2 | 6/2004 | Jeddeloh |
| 6,754,812 B1 | 6/2004 | Abdallah et al. |
| 6,756,661 B2 | 6/2004 | Tsuneda et al. |
| 6,760,833 B1 | 7/2004 | Dowling |
| 6,771,538 B2 | 8/2004 | Shukuri et al. |
| 6,772,295 B2 | 8/2004 | Spencer et al. |
| 6,775,747 B2 | 8/2004 | Venkatraman |
| 6,779,036 B1 | 8/2004 | Deshpande |
| 6,782,466 B1 | 8/2004 | Steele et al. |
| 6,788,104 B2 | 9/2004 | Singh et al. |
| 6,792,059 B2 | 9/2004 | Yuan et al. |
| 6,792,496 B2 | 9/2004 | Aboulenein et al. |
| 6,795,899 B2 | 9/2004 | Dodd et al. |
| 6,799,246 B1 | 9/2004 | Wise et al. |
| 6,799,268 B1 | 9/2004 | Boggs et al. |
| 6,804,760 B2 | 10/2004 | Wiliams |
| 6,804,764 B2 | 10/2004 | Laberge et al. |
| 6,807,630 B2 | 10/2004 | Lay et al. |
| 6,811,320 B1 | 11/2004 | Abbott |
| 6,816,947 B1 | 11/2004 | Huffman |
| 6,820,181 B2 | 11/2004 | Jeddeloh et al. |
| 6,821,029 B1 | 11/2004 | Grung et al. |
| 6,823,023 B1 | 11/2004 | Hannah |
| 6,829,705 B2 | 12/2004 | Smith |
| 6,832,303 B2 | 12/2004 | Tanaka |
| 6,845,409 B1 | 1/2005 | Talagala et al. |
| 6,889,304 B2 | 5/2005 | Perego et al. |
| 6,910,109 B2 | 6/2005 | Holman et al. |
| 6,928,528 B1 | 8/2005 | Hewitt |
| 6,941,433 B1 | 9/2005 | Libby et al. |
| 6,980,042 B2 | 12/2005 | LaBerge |
| 7,006,505 B1 | 2/2006 | Bleszynski et al. |
| 7,107,415 B2 | 9/2006 | Jeddeloh et al. |
| 7,117,316 B2 | 10/2006 | Jeddeloh |
| 7,120,727 B2 | 10/2006 | Lee et al. |
| 7,133,972 B2 | 11/2006 | Jeddeloh |
| 7,162,567 B2 | 1/2007 | Jeddeloh |
| 7,188,219 B2 | 3/2007 | Jeddeloh |
| 7,213,082 B2 | 5/2007 | Jeddeloh |
| 7,249,236 B2 | 7/2007 | Jeddeloh et al. |
| 7,254,075 B2 | 8/2007 | Woo et al. |
| 7,260,685 B2 | 8/2007 | Lee et al. |
| 7,315,053 B2 | 1/2008 | Hosomi et al. |
| 7,318,130 B2 | 1/2008 | Morrow et al. |
| 7,330,992 B2 | 2/2008 | Jeddeloh et al. |
| 7,343,444 B2 | 3/2008 | Lee et al. |
| 7,353,320 B2 | 4/2008 | Jeddeloh |
| 7,434,081 B2 | 10/2008 | Jeddeloh et al. |
| 8,392,686 B2 | 3/2013 | Jeddeloh et al. |
| 2001/0037428 A1 | 11/2001 | Hsu et al. |
| 2001/0039612 A1 | 11/2001 | Lee |
| 2002/0002656 A1 | 1/2002 | Honma et al. |
| 2002/0078298 A1 | 6/2002 | Jeddeloh |
| 2002/0112119 A1 | 8/2002 | Halbert et al. |
| 2002/0116588 A1 | 8/2002 | Beckert et al. |
| 2002/0120709 A1 | 8/2002 | Chow et al. |
| 2002/0144064 A1 | 10/2002 | Fanning |
| 2002/0178319 A1 | 11/2002 | Sanchez-Olea |
| 2003/0005223 A1 | 1/2003 | Coulson et al. |
| 2003/0014578 A1 | 1/2003 | Pax |
| 2003/0043158 A1 | 3/2003 | Wasserman et al. |
| 2003/0043426 A1 | 3/2003 | Baker et al. |
| 2003/0093630 A1 | 5/2003 | Richard et al. |
| 2003/0149809 A1 | 8/2003 | Jensen et al. |
| 2003/0156639 A1 | 8/2003 | Liang |
| 2003/0158995 A1 | 8/2003 | Lee et al. |
| 2003/0163649 A1 | 8/2003 | Kapur et al. |
| 2003/0177320 A1 | 9/2003 | Sah et al. |
| 2003/0193927 A1 | 10/2003 | Hronik |
| 2003/0215042 A1 | 11/2003 | Gauthier et al. |
| 2003/0217223 A1 | 11/2003 | Nino, Jr. et al. |
| 2003/0223295 A1 | 12/2003 | Ozguz et al. |
| 2003/0227798 A1 | 12/2003 | Pax |
| 2003/0229762 A1 | 12/2003 | Maiyuran et al. |
| 2003/0229770 A1 | 12/2003 | Jeddeloh |
| 2003/0235072 A1 | 12/2003 | Kim et al. |
| 2004/0006671 A1 | 1/2004 | Handgen |
| 2004/0015666 A1 | 1/2004 | Rojas et al. |
| 2004/0019728 A1 | 1/2004 | Sharma |
| 2004/0022094 A1 | 2/2004 | Radhakrishnan et al. |
| 2004/0024959 A1 | 2/2004 | Taylor |
| 2004/0024978 A1 | 2/2004 | Jeddeloh |
| 2004/0034753 A1 | 2/2004 | Jeddeloh |
| 2004/0034825 A1 | 2/2004 | Jeddeloh |
| 2004/0039886 A1 | 2/2004 | Christofferson et al. |
| 2004/0044833 A1 | 3/2004 | Ryan |
| 2004/0049649 A1 | 3/2004 | Durrant |
| 2004/0064602 A1 | 4/2004 | George |
| 2004/0122988 A1 | 6/2004 | Han et al. |
| 2004/0126115 A1 | 7/2004 | Levy et al. |
| 2004/0144994 A1 | 7/2004 | Lee et al. |
| 2004/0158677 A1 | 8/2004 | Dodd |
| 2004/0170196 A1 | 9/2004 | Susnow |
| 2004/0236885 A1 | 11/2004 | Fredriksson et al. |
| 2004/0260864 A1 | 12/2004 | Lee et al. |
| 2004/0260909 A1 | 12/2004 | Lee et al. |
| 2004/0268061 A1 | 12/2004 | Khare et al. |
| 2005/0044327 A1 | 2/2005 | Howard et al. |
| 2005/0060533 A1 | 3/2005 | Woo et al. |
| 2005/0066137 A1 | 3/2005 | Jeddeloh et al. |
| 2005/0071542 A1 | 3/2005 | Weber et al. |
| 2005/0078506 A1 | 4/2005 | Rao et al. |
| 2005/0105350 A1 | 5/2005 | Zimmerman |
| 2005/0149774 A1 | 7/2005 | Jeddeloh et al. |
| 2005/0172084 A1 | 8/2005 | Jeddeloh |
| 2005/0216678 A1 | 9/2005 | Jeddeloh |
| 2005/0223161 A1 | 10/2005 | Jeddeloh |
| 2005/0246558 A1 | 11/2005 | Ku |
| 2005/0257005 A1 | 11/2005 | Jeddeloh |

(56) References Cited

U.S. PATENT DOCUMENTS

| | | |
|---|---|---|
| 2005/0286506 A1 | 12/2005 | LaBerge |
| 2006/0085616 A1 | 4/2006 | Zeighami et al. |
| 2006/0168407 A1 | 7/2006 | Stern |
| 2006/0200642 A1 | 9/2006 | LaBerge |
| 2006/0206679 A1 | 9/2006 | Jeddeloh et al. |
| 2006/0212655 A1 | 9/2006 | Jeddeloh |
| 2006/0212666 A1 | 9/2006 | Jeddeloh |
| 2006/0288172 A1 | 12/2006 | Lee et al. |
| 2007/0011392 A1 | 1/2007 | Lee et al. |
| 2007/0033353 A1 | 2/2007 | Jeddeloh |
| 2007/0055817 A1 | 3/2007 | Jeddeloh |
| 2007/0088915 A1 | 4/2007 | Archambault et al. |
| 2007/0113027 A1 | 5/2007 | Jeddeloh |
| 2007/0271435 A1 | 11/2007 | Jeddeloh et al. |
| 2009/0013143 A1 | 1/2009 | Jeddeloh et al. |
| 2009/0125688 A1 | 5/2009 | Jeddeloh |
| 2013/0326164 A1 | 12/2013 | Jeddeloh |

FOREIGN PATENT DOCUMENTS

| | | |
|---|---|---|
| EP | 0 849 685 A2 | 6/1998 |
| EP | 0849685 | 6/1998 |
| EP | 1 199 637 | 4/2002 |
| GB | 2 244 157 | 11/1991 |
| GB | 2244157 | 11/1991 |
| JP | 02/232890 | 9/1990 |
| JP | 06/004401 | 1/1994 |
| JP | 06/028180 | 2/1994 |
| JP | 06/266616 | 9/1994 |
| JP | 08/185383 | 7/1996 |
| JP | 08/255107 | 10/1996 |
| JP | 10/228413 | 8/1998 |
| JP | 2000/268006 | 9/2000 |
| JP | 2001-265539 A | 9/2001 |
| KR | 00/0067533 | 11/2000 |
| TW | 387072 | 4/2000 |
| TW | 491970 | 7/2002 |
| WO | WO-93/18459 | 9/1993 |
| WO | WO-93/19422 | 9/1993 |
| WO | WO-97/04401 | 2/1997 |
| WO | WO-99/23570 | 5/1999 |
| WO | WO-99/34294 | 7/1999 |
| WO | WO-00/26798 | 5/2000 |
| WO | WO-00/43902 | 7/2000 |
| WO | WO-02/27499 A2 | 4/2002 |
| WO | WO-03/104996 | 12/2003 |

OTHER PUBLICATIONS

Hellwagner, Hermann et al., "Enabling a PC Cluster for High-Performance Computing", The SpeedUp Journal, vol. 11, No. 1, Jun. 1997, 1-9.

Intel, "Intel 840 Chipset: 82840 Memory Controller Hub (MCH)", Datasheet, www.intel.com/design/chipsets/datashts/298020.htm, Oct. 1999, 1-178.

Micron Technology, Inc., "Synchronous DRAM Module 512MB/1GB (x72, ECC) 168-PIN Registered FBGA SDRAM DIMM", Micron Technology, Inc, Jun. 2002, 1-23.

Intel, "Flash Memory PCI Add-In Card for Embedded Systems", Application Note AP-758, Sep. 1997, pp. i-13.

Shanley, T et al., "PCI System Architecture", Third Edition. Mindshare, Inc., 1995, Jul. 1996, 24-25.

SYSTEM AND METHOD FOR READ SYNCHRONIZATION OF MEMORY MODULES

CROSS-REFERENCE TO RELATED APPLICATIONS

This application is a continuation of U.S. patent application Ser. No. 12/233,492, filed Sep. 18, 2008, U.S. Pat. No. 8,392,686, which is a continuation of U.S. patent application Ser. No. 11/432,060, filed May 10, 2006, U.S. Pat. No. 7,434,081, which is a continuation of U.S. patent application Ser. No. 10/747,917, filed Dec. 29, 2003, U.S. Pat. No. 7,330,992. These applications and patents are incorporated by reference herein in their entirety and for all purposes.

TECHNICAL FIELD

The present invention relates to a processor-based system, and more particularly, to a processor-based system having a memory module with a memory hub coupling several memory devices to a processor or other memory access devices.

BACKGROUND OF THE INVENTION

Processor-based systems, such as computer systems, use memory devices, such as dynamic random access memory ("DRAM") devices, to store instructions and data that are accessed by a processor. These memory devices are typically used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory hub controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory module while another memory module is responding to a prior memory access. For example, the processor can output write data to one of the memory modules in the system while another memory module in the system is preparing to provide read data to the processor. The operating efficiency of computer systems using a memory hub architecture can make it more practical to vastly increase data bandwidth of a memory system. A memory hub architecture can also provide greatly increased memory capacity in computer systems.

Although there are advantages to utilizing a memory hub for accessing memory devices, the design of the hub memory system, and more generally, computer systems including such a memory hub architecture, becomes increasingly difficult. For example, in many hub based memory systems, the processor is coupled through a memory hub controller to each of several memory hubs via a high speed bus or link over which signals, such as command, address, or data signals, are transferred at a very high rate. The memory hubs are, in turn, coupled to several memory devices via buses that must also operate at a very high speed. However, as transfer rates increase, the time for which a signal represents valid information is decreasing. As commonly referenced by those ordinarily skilled in the art, the window or "eye" for when the signals are valid decreases at higher transfer rates. With specific reference to data signals, the "data eye" decreases. As understood by one skilled in the art, the data eye for each of the data signals defines the actual duration that each signal is valid after various factors affecting the signal are considered, such as timing skew, voltage and current drive capability, and the like. In the case of timing skew of signals, it often arises from a variety of timing errors such as loading on the lines of the bus and the physical lengths of such lines.

As data eyes of signals decrease at higher transfer rates, it is possible that one or more of a groups of signals provided by a memory device in parallel will have different arrival times at a memory hub to which the memory devices are coupled. As a result, not all of the signals will be simultaneously valid at the memory hub, thus preventing the memory hub from successfully capturing the signals. For example, where a plurality of signals are provided in parallel over a bus, the data eye of one or more of the particular signals do not overlap with the data eyes of the other signals. In this situation, the signals having non-overlapping data eyes are not valid at the same time as the rest of the signals, and consequently, cannot be successfully captured by the memory hub. Clearly, as those ordinarily skilled in the art will recognize, the previously described situation is unacceptable.

One approach to alleviating timing problems in memory devices is to use a delay-locked loop (DLL) or delay line (DL) to lock or align the receipt of read data from a memory device to a capture strobe signal used to latch the read data in a memory hub. More specifically, a read strobe signal is output by the memory devices along with read data signals. At higher transfer rates, the timing of the read strobe signal can vary so that it cannot be reliably used to capture the read data signals in the memory hub. Further, even if the read data strobe could reliably capture the read data signals in the memory hub, the time at which the read data signals were captured could vary in relation to a core clock domain used to control the operation of the memory hub that is coupled to the memory device.

In such case, the read data may not be present in the memory hub at the proper time. To alleviate this problem, the timing of the read data strobe signals is adjusted using the DLL or DL to generate a capture clock signal that can reliably capture the read data signals. The DLL or DL is thus effective in preventing substantial drifting of a read data eye in relation to the core clock domain. As transfer rates increase, however, the timing specifications for the DLL or DL become more stringent and therefore increasingly difficult to meet. Furthermore, the amount of circuitry required to implement a suitable DLL or DL can materially reduce the amount of space that could otherwise be used for memory device circuitry, thereby either increasing the cost or reducing the storage capacity of such memory devices.

There is accordingly a need for a system and method that avoids the need to precisely control the timing relationships between a memory hub clock domain and the receipt of read data signals at the memory hub in a manner that avoids the need for extensive DLL or DL circuitry.

DETAILED DESCRIPTION OF THE INVENTION

Embodiments of the present invention are directed to a memory hub module having the capability to perform a read channel synchronization. Certain details are set forth below to provide a sufficient understanding of various embodiments of the invention. However, it will be clear to one skilled in the art that the invention may be practiced without these particular details. In other instances, well-known circuits, control signals, and timing protocols have not been shown in detail in order to avoid unnecessarily obscuring the invention.

Figure 1:
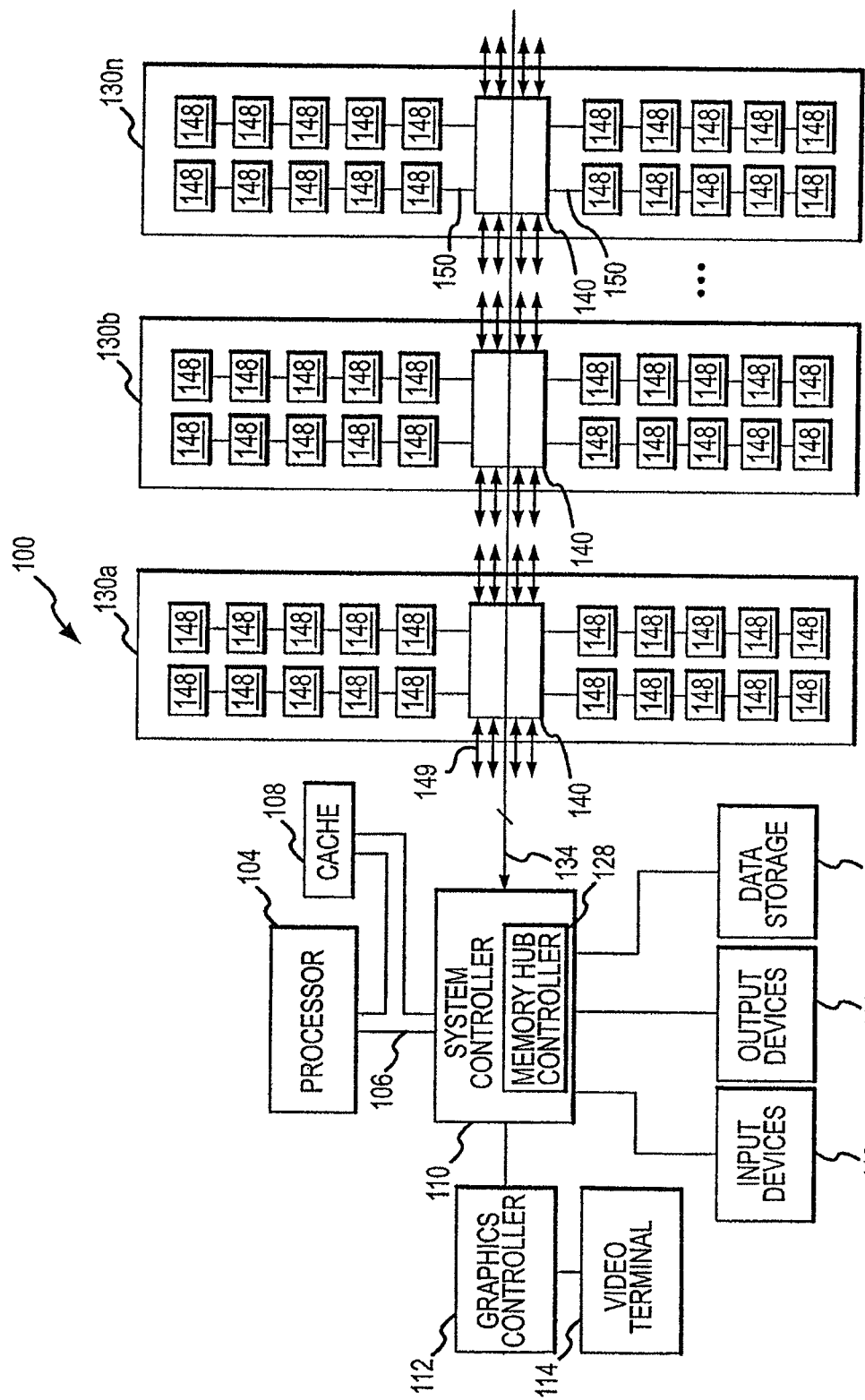
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a, b . . . n, which serve as system memory for the computer system 100. The memory modules 130 are preferably coupled to the system controller 110 through respective high-speed links 134a and 134b, which may be optical or electrical communication paths or some other type of communications paths. The high speed link 134a is the downlink, carrying memory requests from the memory hub controller 132 to the memory modules 130a-n. The high speed link 134b is the uplink, carrying memory responses from the memory modules 130a-n to the memory hub controller 132. In the event the high-speed links 134a and 134b are implemented as optical communication paths, the optical communication paths may be in the form of one or more optical fibers, for example. In such case, the system controller 110 and the memory modules will include an optical input/output port or separate input and output ports coupled to the optical communication paths. The memory modules 130 are shown coupled to the system controller 110 in a multi-drop arrangement in which the high-speed links 134a and 134b are coupled to all of the memory modules 130. However, it will be understood that other topologies may also be used, such as a point-to-point coupling arrangement in which a separate high-speed link (not shown) is used to couple each of the memory modules 130 to the system controller 110. A switching topology may also be used in which the system controller 110 is selectively coupled to each of the memory modules 130 through a switch (not shown). Other topologies that may be used will be apparent to one skilled in the art.

Each of the memory modules 130 includes a memory hub 140 for controlling access to 32 memory devices 148, which, in the example illustrated in FIG. 1, are synchronous dynamic random access memory ("SDRAM") devices. However, a fewer or greater number of memory devices 148 may be used, and memory devices other than SDRAM devices may, of course, also be used. In the example illustrated in FIG. 1, the memory hubs 140 communicate over 4 independent memory channels 149 over the high-speed links 134a and 134b. In this example, although not shown in FIG. 1, 4 memory hub controllers 128 are provided, each to receive data from one memory channel 149. A fewer or greater number of memory channels 149 may be used, however, in other examples. The memory hub 140 is coupled to each of the system memory devices 148 through a bus system 150, which normally includes a control bus, an address bus and a data bus.

Figure 2:
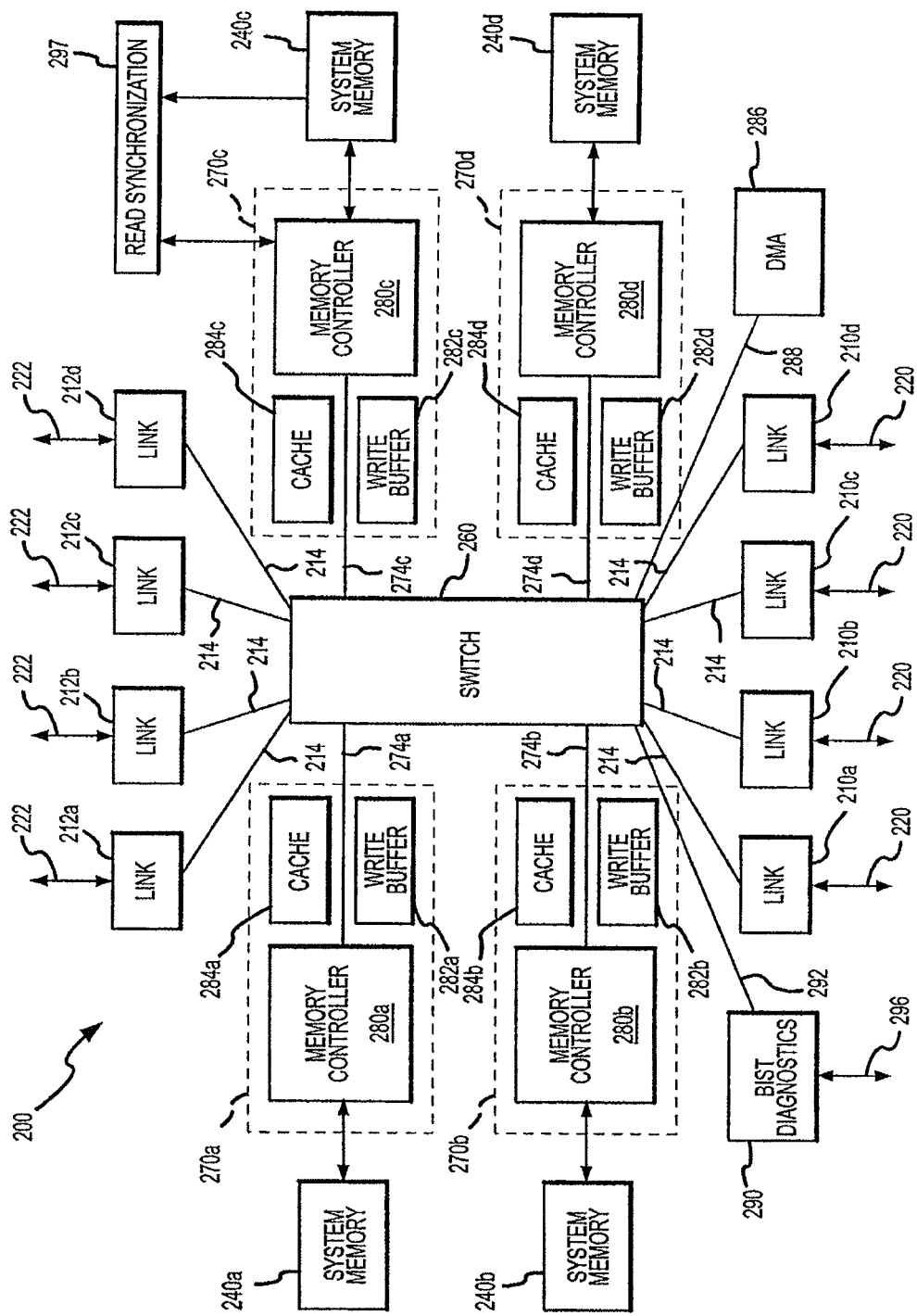
FIG. 2 is a block diagram of a memory hub used in the computer system of FIG. 1, which contains read synchronization modules according to one example of the invention.

A memory hub 200 according to an embodiment of the present invention is shown in FIG. 2. The memory hub 200 can be substituted for the memory hub 140 of FIG. 1. The memory hub 200 is shown in FIG. 2 as being coupled to four memory devices 240a-d, which, in the present example are conventional SDRAM devices. In an alternative embodiment, the memory hub 200 is coupled to four different banks of memory devices, rather than merely four different memory devices 240a-d, with each bank typically having a plurality of memory devices. However, for the purpose of providing an example, the present description will be with reference to the memory hub 200 coupled to the four memory devices 240a-d. It will be appreciated that the necessary modifications to the memory hub 200 to accommodate multiple banks of memory is within the knowledge of those ordinarily skilled in the art.

Further included in the memory hub 200 are link interfaces 210a-d and 212a-d for coupling the memory module on which the memory hub 200 is located to a first high speed data link 220 and a second high speed data link 222, respectively. As previously discussed with respect to FIG. 1, the high-speed data links 220, 222 can be implemented using an optical or electrical communication path or some other type of communication path. The link interfaces 210a-d, 212a-d are conventional, and include circuitry used for transferring data, command, and address information to and from the high speed data links 220, 222. As well known, such circuitry includes transmitter and receiver logic known in the art. It will be appreciated that those ordinarily skilled in the art have sufficient understanding to modify the link interfaces 210a-d, 212a-d to be used with specific types of communication paths, and that such modifications to the link interfaces 210a-d, 212a-d can be made without departing from the scope of the present invention. For example, in the event the high-speed data link 220, 222 is implemented using an optical communications path, the link interfaces 210a-d, 212a-d will include an optical input/output port that can convert optical signals coupled through the optical communications path into electrical signals.

The link interfaces 210a-d, 212a-d are coupled to a switch 260 through a plurality of bus and signal lines, represented by busses 214. The busses 214 are conventional, and include a write data bus and a read data bus, although a single bi-directional data bus may alternatively be provided to couple data in both directions through the link interfaces 210a-d, 212a-d. It will be appreciated by those ordinarily skilled in the art that the busses 214 are provided by way of example, and that the busses 214 may include fewer or greater signal lines, such as further including a request line and a snoop line, which can be used for maintaining cache coherency.

The link interfaces 210a-d, 212a-d include circuitry that allow the memory hub 200 to be connected in the system memory in a variety of configurations. For example, the multi-drop arrangement, as shown in FIG. 1, can be implemented by coupling each memory module to the memory hub controller 128 through either the link interfaces 210a-d or 212a-d. Alternatively, a point-to-point, or daisy chain configuration can be implemented by coupling the memory modules in series. For example, the link interfaces 210a-d can be used to couple a first memory module and the link interfaces 212a-d can be used to couple a second memory module. The memory module coupled to a processor, or system controller, will be coupled thereto through one set of the link interfaces and further coupled to another memory module through the other set of link interfaces. In one embodiment of the present invention, the memory hub 200 of a memory module is coupled to the processor in a point-to-point arrangement in which there are no other devices coupled to the connection between the processor 104 and the memory hub 200. This type of interconnection provides better signal coupling between the processor 104 and the memory hub 200 for several reasons, including relatively low capacitance, relatively few line discontinuities to reflect signals and relatively short signal paths.

The switch 260 is further coupled to four memory interfaces 270a-d which are, in turn, coupled to the system memory devices 240a-d, respectively. By providing a separate and independent memory interface 270a-d for each system memory device 240a-d, respectively, the memory hub 200 avoids bus or memory bank conflicts that typically occur with single channel memory architectures. The switch 260 is coupled to each memory interface through a plurality of bus and signal lines, represented by busses 274. The busses 274 include a write data bus, a read data bus, and a request line. However, it will be understood that a single bi-directional data bus may alternatively be used instead of a separate write data bus and read data bus. Moreover, the busses 274 can include a greater or lesser number of signal lines than those previously described.

In an embodiment of the present invention, each memory interface 270a-d is specially adapted to the system memory devices 240a-d to which it is coupled. More specifically, each memory interface 270a-d is specially adapted to provide and receive the specific signals received and generated, respectively, by the system memory device 240a-d to which it is coupled. Also, the memory interfaces 270a-d are capable of operating with system memory devices 240a-d operating at different clock frequencies. As a result, the memory interfaces 270a-d isolate the processor 104 from changes that may occur at the interface between the memory hub 230 and memory devices 240a-d coupled to the memory hub 200, and it provides a more controlled environment to which the memory devices 240a-d may interface.

The switch 260 coupling the link interfaces 210a-d, 212a-d and the memory interfaces 270a-d can be any of a variety of conventional or hereinafter developed switches. For example, the switch 260 may be a cross-bar switch that can simultaneously couple link interfaces 210a-d, 212a-d and the memory interfaces 270a-d to each other in a variety of arrangements. The switch 260 can also be a set of multiplexers that do not provide the same level of connectivity as a cross-bar switch but nevertheless can couple the some or all of the link interfaces 210a-d, 212a-d to each of the memory interfaces 270a-d. The switch 260 may also includes arbitration logic (not shown) to determine which memory accesses should receive priority over other memory accesses. Bus arbitration performing this function is well known to one skilled in the art.

With further reference to FIG. 2, each of the memory interfaces 270a-d includes a respective memory controller 280, a respective write buffer 282, and a respective cache memory unit 284. The memory controller 280 performs the same functions as a conventional memory controller by providing control, address and data signals to the system memory device 240a-d to which it is coupled and receiving data signals from the system memory device 240a-d to which it is coupled. The write buffer 282 and the cache memory unit 284 include the normal components of a buffer and cache memory, including a tag memory, a data memory, a comparator, and the like, as is well known in the art. The memory devices used in the write buffer 282 and the cache memory unit 284 may be either DRAM devices, static random access memory ("SRAM") devices, other types of memory devices, or a combination of all three. Furthermore, any or all of these memory devices as well as the other components used in the cache memory unit 284 may be either embedded or stand-alone devices.

The write buffer 282 in each memory interface 270a-d is used to store write requests while a read request is being serviced. In such a system, the processor 104 can issue a write request to a system memory device 240a-d even if the memory device to which the write request is directed is busy servicing a prior write or read request. Using this approach, memory requests can be serviced out of order since an earlier write request can be stored in the write buffer 282 while a subsequent read request is being serviced. The ability to buffer write requests to allow a read request to be serviced can greatly reduce memory read latency since read requests can be given first priority regardless of their chronological order. For example, a series of write requests interspersed with read requests can be stored in the write buffer 282 to allow the read requests to be serviced in a pipelined manner followed by servicing the stored write requests in a pipelined manner. As a result, lengthy settling times between coupling write request to the memory devices 270*a-d* and subsequently coupling read request to the memory devices 270*a-d* for alternating write and read requests can be avoided.

The use of the cache memory unit 284 in each memory interface 270*a-d* allows the processor 104 to receive data responsive to a read command directed to a respective system memory device 240*a-d* without waiting for the memory device 240*a-d* to provide such data in the event that the data was recently read from or written to that memory device 240*a-d*. The cache memory unit 284 thus reduces the read latency of the system memory devices 240*a-d* to maximize the memory bandwidth of the computer system. Similarly, the processor 104 can store write data in the cache memory unit 284 and then perform other functions while the memory controller 280 in the same memory interface 270*a-d* transfers the write data from the cache memory unit 284 to the system memory device 240*a-d* to which it is coupled.

Further included in the memory hub 200 is a built in self-test (BIST) and diagnostic engine 290 coupled to the switch 260 through a diagnostic bus 292. The diagnostic engine 290 is further coupled to a maintenance bus 296, such as a System Management Bus (SMBus) or a maintenance bus according to the Joint Test Action Group (JTAG) and IEEE 1149.1 standards. Both the SMBus and JTAG standards are well known by those ordinarily skilled in the art. Generally, the maintenance bus 296 provides a user access to the diagnostic engine 290 in order to perform memory channel and link diagnostics. For example, the user can couple a separate PC host via the maintenance bus 296 to conduct diagnostic testing or monitor memory system operation. By using the maintenance bus 296 to access diagnostic test results, issues related to the use of test probes, as previously discussed, can be avoided. It will be appreciated that the maintenance bus 296 can be modified from conventional bus standards without departing from the scope of the present invention. It will be further appreciated that the diagnostic engine 290 should accommodate the standards of the maintenance bus 296, where such a standard maintenance bus is employed. For example, the diagnostic engine should have an maintenance bus interface compliant with the JTAG bus standard where such a maintenance bus is used.

Further included in the memory hub 200 is a DMA engine 286 coupled to the switch 260 through a bus 288. The DMA engine 286 enables the memory hub 200 to move blocks of data from one location in the system memory to another location in the system memory without intervention from the processor 104. The bus 288 includes a plurality of conventional bus lines and signal lines, such as address, control, data busses, and the like, for handling data transfers in the system memory. Conventional DMA operations well known by those ordinarily skilled in the art can be implemented by the DMA engine 286. The DMA engine 286 is able to read a link list in the system memory to execute the DMA memory operations without processor intervention, thus, freeing the processor 104 and the bandwidth limited system bus from executing the memory operations. The DMA engine 286 can also include circuitry to accommodate DMA operations on multiple channels, for example, for each of the system memory devices 240*a-d*. Such multiple channel DMA engines are well known in the art and can be implemented using conventional technologies.

The diagnostic engine 290 and the DMA engine 286 are preferably embedded circuits in the memory hub 200. However, including separate a diagnostic engine and a separate DMA device coupled to the memory hub 200 is also within the scope of the present invention.

Embodiments of the present invention provide a read synchronization module 297 for controlling the timing of read requests sent to the memory devices 240 so that read data signals are received at the memory hub 200 at the proper time in relation to a system clock signal used to establish a clock domain for the memory hub 200. Although a single synchronization module 297 is shown in FIG. 2, it is to be understood that a plurality of synchronization modules 297 may also be used, for example, one per memory controller 280. Further, in the embodiment shown in FIG. 2, the synchronization module 297 is shown in communication with the memory device 240*c* and the memory controller 280*c*. In some embodiments, the synchronization module 297 may be in communication with one or more memory devices and the controller 100 or memory hub 140 shown in FIG. 1. As mentioned above, the memory synchronization module 297 functions to synchronize the coupling of read data from the memory device with the core clock domain of the memory hub 200 as established by a system clock signal from the memory hub controller 128. Accordingly, if data is sent by the memory devices 148 either too early or too late, the read data might be coupled to the memory hub 200 at a time that is not synchronized to the core clock domain of the memory hub 200. Significantly, the synchronization module 297 allows the timing of a strobe signal used to capture read data signals to drift as needed so that the read data signals are captured at the proper time in relation to the core clock domain.

Figure 3:
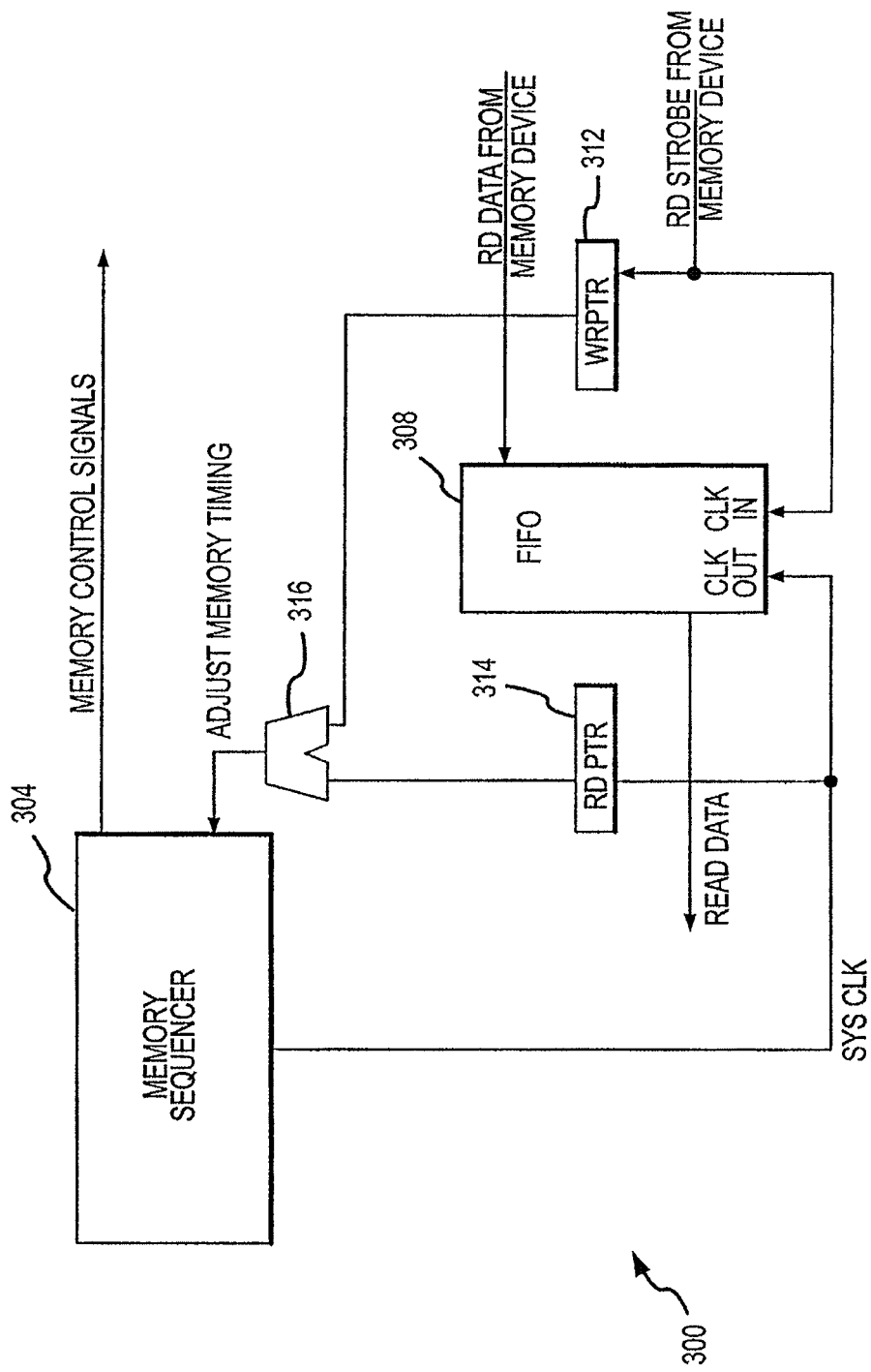
FIG. 3 is a block diagram of one embodiment of a synchronization system according to one example of the invention.

FIG. 3 illustrates a read synchronization module 300 according to an embodiment of the present invention that can be used as the read synchronization module 297 shown in FIG. 2. It will be appreciated that FIG. 3 is a functional block diagram representative of a suitable synchronization module and is not intended to limit the scope of the present invention. The functional blocks shown in FIG. 3 are conventional, and can be implemented using well known techniques and circuitry. It will be further appreciated that control signals and other functional blocks have been omitted from FIG. 3 in order to avoid unnecessarily obscuring the present invention, and that the description provided herein is sufficient to enable those ordinarily skilled in the art to practice the invention.

Included in the read synchronization module 300 is a memory sequencer 304 that generates properly timed signals for controlling the operation of the memory devices 148 (FIG. 1) or 240 (FIG. 2). However, in alternative embodiments, the DMA engine 286 may be used for this purpose. The nature of the signals generated by the memory sequencer 304 will, of course, be determined by the nature of the signals used by the memory devices 148, 240. The timing of the signals controlling the operation of the memory devices 148, 240 control the time when read data signals are output from the memory devices 148, 240.

A buffer 308 is used to store read data received from one or more of the memory devices 148, 240. The buffer 308 in FIG. 3 is a first-in first-out (FIFO) buffer, such as a circular buffer, and may be implemented as known in the art. The buffer 308 is clocked with a read strobe signal, which may also be referred to as a read clock signal. The read strobe signal is generated by the memory devices 148, 240 and is output from the memory devices 148, 240 along with read data signals. When the read data is clocked into the buffer 308 by the read strobe signal, i.e., the read data are written to the buffer 308, a write pointer, 312 is incremented. The read data are clocked out of the buffer 308 and coupled to the memory hub controller 132 (FIG. 1) by a core clock signal, which may be derived from a system clock signal. When data is clocked out of the buffer 308 by the core clock, i.e., the read data are read from the buffer 308, a read pointer 314 is incremented. The read pointer 314 and the write pointer 312 are then compared by a comparator 316. Comparator 316 generates an adjust signal in response to the comparison. Generally, the relationship between the read pointer 314 and the write pointer 312 identifies the crossing margin from the memory device timing domain represented by the read strobe signal to the core clock timing domain—the "data eye", as described above.

The adjust signal is fed back to the memory sequencer 304. The data eye will decrease; i.e., the read pointer 314 will be too close to the write pointer 312, if the read data are being coupled from the memory devices 148, 240 too early in relation to the core clock coupling the read data to the memory hub controller 128. In such case, the memory sequencer 304 reduces the rate at which read data are coupled from the memory devices 148. Conversely, the data eye will increase, i.e., the read pointer 314 will be too far away from the write pointer 312, if the read data are being coupled from the memory devices 148 too late in relation to the core clock coupling the read data to the memory hub controller 128. In such case, the memory sequencer 304 increases the rate at which read data are coupled from the memory devices 148. As a result, the read data are coupled from the memory devices 148 at a rate that is adjusted to match the timing of the core clock signal.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:
   a storage circuit configured to receive read data based, at least in part, on a first clock signal, and to provide the read data based, at least in part, on a second clock signal; and
   a comparison component coupled to the storage circuit and configured to compare a first time in which the read data is received by the storage circuit with a second time in which the read data is provided from the storage circuit, the comparison component further configured to provide an adjust signal based, at least in part, on the comparison, the adjust signal indicative of a timing at which subsequent read data are provided to the storage circuit.

2. The apparatus of claim 1, further comprising:
   a memory sequencer configured to receive the adjust signal and adjust the rate of the timing at which subsequent read data provided to the storage circuit based, at least in part, on the adjust signal.

3. The apparatus of claim 1, wherein the comparison component comprises:
   a first counter configured to increment responsive, at least in part, to the storage circuit receiving the read data;
   a second counter operable to increment responsive, at least in part, to the storage circuit providing the read data; and
   a comparator configured to compare a count of the first counter and a count of the second counter to generate the adjust signal.

4. The apparatus of claim 1, wherein the storage circuit comprises a first-in first-out (FIFO) buffer.

5. The apparatus of claim 1, wherein the comparison component further configured to provide an adjust signal based, at least in part, on the comparison comprises:
   the comparison component further configured to compare a read pointer and a write pointer.

6. The apparatus of claim 1, wherein the adjust signal is indicative of a crossing margin between a first time domain and a second time domain.

7. An apparatus, comprising:
   a storage circuit configured receive a read data signal in accordance with a first signal and further configured to provide the read data signal in accordance with a second signal;
   a write pointer configured to increment responsive, at least in part, to the first signal;
   a read pointer configured to increment responsive, at least in part, to the second signal; and
   a comparator configured to compare the write pointer and the read pointer to generate an adjust signal based, at least in part, on the comparison.

8. The apparatus of claim 7, wherein the first signal comprises a read clock signal and the second signal comprises a core clock signal.

9. The apparatus of claim 7, further comprising:
   a signal generator coupled to the comparator and configured to receive the adjust signal, the signal generator further configured to generate one or more control signals to adjust the time at which read data is provided to the storage circuit based, at least in part, on the adjust signal.

10. The apparatus of claim 9, wherein the signal generator further configured to generate one or more control signals to adjust the time at which read data is provided to the storage circuit based, at least in part, on the adjust signal comprises:
    the signal generator further configured to generate one or more control signals to adjust the time between a request being received at a first interface and the request being provided to a second interface.

11. The apparatus of claim 9, wherein the signal generator further configured to generate one or more control signals to adjust the time at which read data is provided to the storage circuit based, at least in part, on the adjust signal comprises:
    the signal generator further configured to reduce the rate at which read data is provided to the storage circuit responsive to the read data being provided to the storage circuit too early and further configured to increase the rate at which read data are provided to the storage circuit responsive to the read data being provided to the storage circuit too late.

12. The apparatus of claim of claim 9, wherein the signal generator comprises a direct memory access (DMA) engine.

13. The apparatus of claim 7, wherein the storage circuit comprises a circular buffer.

14. A method, comprising:
    providing data to a buffer based, at least in part, on a first signal;
    providing the data from the buffer based, at least in part, on a second signal;
    comparing a time at which the data is provided to the buffer and a time at which the data is provided by the buffer; and
    adjusting a rate at which data is provided to the buffer based, at least in part, on the comparison.

15. The method of claim 14, further comprising:
    incrementing a write pointer responsive to providing data to the buffer; and
    incrementing a read pointer responsive to providing data from the buffer.

16. The method of claim 14, wherein the data is a first data, the method further comprising:
    adjusting a rate at which a second data is provided to the buffer based, at least in part, on the comparison.

17. The method of claim 16, wherein adjusting a rate comprises:
   reducing the rate at which the second data is provided to the buffer responsive, at least in part, to the read pointer being too proximate to the write pointer; and
   increasing the rate at which the second data is provided the buffer responsive, at least in part, to the read pointer being too remote from the write pointer.

18. The method of claim 14, wherein providing the data from the buffer based, at least in part, on a second signal comprises:
   providing the data from the buffer based, at least in part, on a second signal, the second signal based, at least in part, on the first signal.

19. The method of claim 14, further comprising:
   providing a second data from a memory at a rate adjusted to match a timing of the second signal.

20. The method of claim 14, wherein the first signal comprises a read clock signal and the second signal comprises a core clock signal.

* * * * *

UNITED STATES PATENT AND TRADEMARK OFFICE
CERTIFICATE OF CORRECTION

PATENT NO. : 8,880,833 B2  
APPLICATION NO. : 13/784526  
DATED : November 4, 2014  
INVENTOR(S) : Joseph M. Jeddeloh et al.

Page 1 of 1

It is certified that error appears in the above-identified patent and that said Letters Patent is hereby corrected as shown below:

On the title page, item (57), under "Abstract", in column 2, line 12, delete "an" and insert -- and --, therefor.

In the Claims

Column 10, line 5, in Claim 7, after "configured" insert -- to --.
Column 10, line 45, in Claim 12, after "of claim" delete "of claim".
Column 11, line 6, in Claim 17, after "provided" insert -- to --.

Signed and Sealed this
Twenty-fourth Day of February, 2015

Michelle K. Lee
*Deputy Director of the United States Patent and Trademark Office*